(12) United States Patent
Senter

(10) Patent No.: US 8,020,917 B1
(45) Date of Patent: Sep. 20, 2011

(54) ICE SCREEN

(76) Inventor: David Senter, Windsor Locks, CT (US)

( * ) Notice: Subject to any disclaimer, the term of this patent is extended or adjusted under 35 U.S.C. 154(b) by 0 days.

(21) Appl. No.: 12/702,700

(22) Filed: Feb. 9, 2010

(51) Int. Cl.
*B60J 11/04* (2006.01)
(52) U.S. Cl. .................................. 296/136.01
(58) Field of Classification Search ............. 296/136.01, 296/136.02, 136.07, 136.09
See application file for complete search history.

(56) References Cited

U.S. PATENT DOCUMENTS

| | | | | |
|---|---|---|---|---|
| 4,041,656 A | * | 8/1977 | Anderson | 52/16 |
| 2006/0061132 A1 | * | 3/2006 | Sua-an | 296/136.01 |

FOREIGN PATENT DOCUMENTS

RU 2154137 * 8/2000

* cited by examiner

*Primary Examiner* — Dennis Pedder
(74) *Attorney, Agent, or Firm* — Kyle Fletcher

(57) ABSTRACT

The ice screen includes a plurality of brackets that attach said screen to a top surface of a tractor-trailer for securing ice formed atop said trailer. The brackets attach to the top surface of the trailer or box truck via attaching means comprising bolts, rivets, or screws. The ice screen is suspended above the top surface of the trailer or box truck via tubing, which forms channels of ice thereon. The ice screen enables ice to form between the ice screen and the top surface, but will prevent ice from accumulating above said ice screen in affect bonding the ice screen above the screen to the ice screen. The ice screen may be installed upon a utility trailer, flat top truck, tractor-trailer, or box truck.

16 Claims, 8 Drawing Sheets

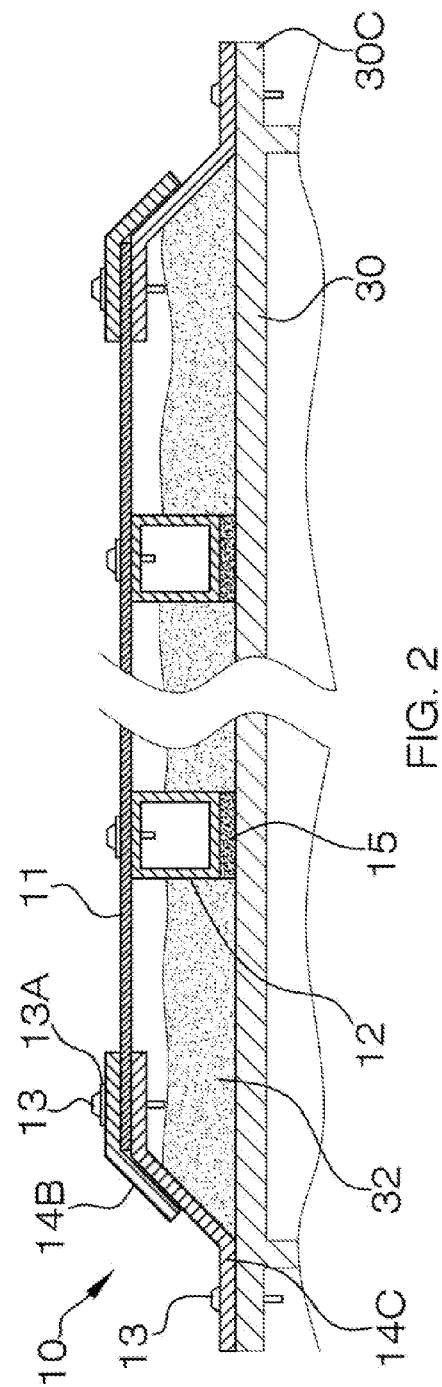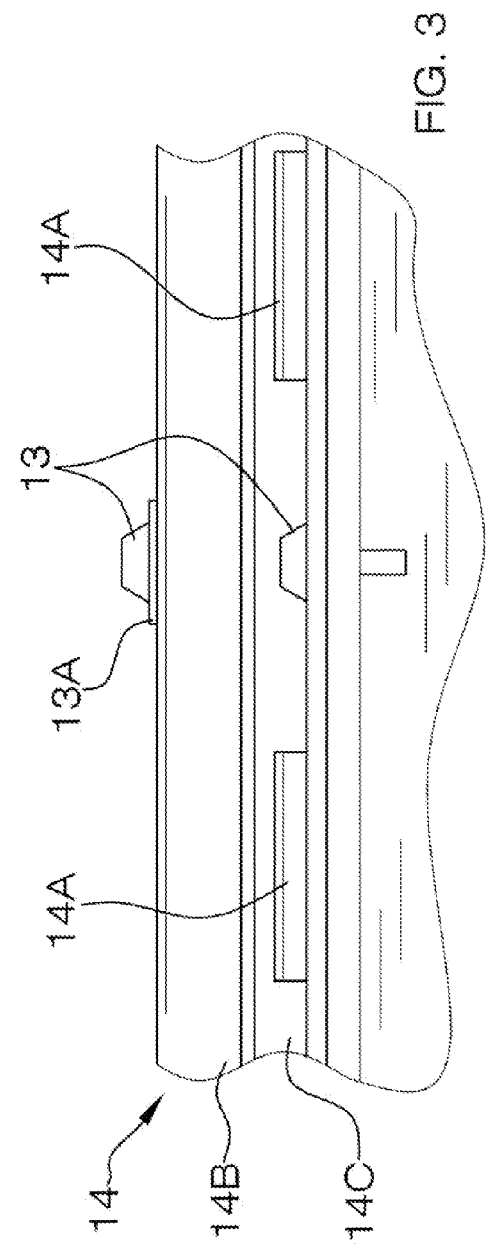

ICE SCREEN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of ice screen systems, more specifically, an ice screen system for use with the top surface of a trailer or box truck.

In areas having a lot of frozen precipitation, snow or ice build-up can occur. In said areas where a lot of tractor trailers or box trucks drive, this accumulation can become quite a hazard atop the trailers driven down roads. When a trailer or box truck rounds a corner, built-up of snow and ice atop said trailer can fly off and become a hazard to passing motorists or pedestrians.

Frozen precipitation can fall onto a trailer or box truck, and subsequently thaw and re-melt as ice that sticks to the top of said trailer or box truck. When this kind of ice forms onto said trailer or box truck top, it can be difficult to remove when the temperature is at or below freezing, and can be dangerous if it falls off said trailer or box truck at any velocities. Ice that falls from a top of a trailer or box truck is especially dangerous when it occurs at a high velocity. In such a case it is desirable to insure that said ice is secured to said trailer or box truck top when the trailer or box truck is being used so that other vehicles or pedestrians are not impacted by said ice.

That being said, there is a need to either (1) prevent build up of snow or ice atop trailers and box trucks, or (2) secure build up of ice to said trailer or box truck in order to prevent said ice from falling off the trailer or box truck during transit of said trailer. The present idea seeks to address the second need by preventing ice from falling off a top surface of a trailer or box truck when in use.

B. Discussion of the Prior Art

As a preliminary note, it should be stated that there is an ample amount of prior art that deals with ice screens. As will be discussed immediately below, no prior art discloses a system comprising a plurality of brackets that attach atop a trailer or box truck for the purposes of securing an ice screen thereon that in turn secures ice frozen atop a trailer or box truck.

The Shaw Patent Application Publication (U.S. Pub. No. 2002/0166265) discloses a suspended scraper used to remove snow from the top of a flat truck, trailer, or bus roof. However, the scraper is designed to remove ice or snow accumulation as opposed to secure ice that forms at a top surface of said trailer after subsequent melting and freezing has occurred, respectively.

The Sua-an Patent Application Publication (U.S. Pub. No. 2006/0061132) discloses a portable device for shielding vehicles from snow during a snow storm, consisting of several detachable members with legs and supports that, when assembled, from a roof-like structure resembling a modified cot. However, the modified cot prevents snow or ice from attaching to a top surface of a vehicle, as opposed to securing ice to said top surface upon a subsequent thawing and freezing.

The Dhanray Patent Application Publication (U.S. Pub. No. 2007/0085372) discloses a snow and ice repelling vehicle cover comprising of a plurality of panels. Again, the snow and ice repelling vehicle cover is directed to preventing snow or ice from coming into contact with a top surface of a vehicle, as opposed to securing ice that forms at a top surface of said vehicle when thawing and freezing occurs after the frozen accumulation occurs in order to prevent the ice from falling off during transit of said vehicle.

The Brattrud Patent (U.S. Pat. No. 4,131,289) discloses a device for protection of vehicle windows against ice or frost. However, the device is pulled over a window and does not secure ice frozen to a top surface of said vehicle.

The Schmitt Patent (U.S. Pat. No. 6,453,500) discloses an apparatus for clearing snow and ice from the roof or top surface of a commercial vehicle, such as a tractor-trailer. Again, the apparatus is directed to removing snow or ice, as opposed to securing ice that forms at a top surface in order to prevent said ice from falling off during transit or movement of said commercial vehicle or trailer.

The Mecham Patent (U.S. Pat. No. 6,923,498) discloses a recreational vehicle cover that rests on the roof of a recreational vehicle that is capable of protecting the vehicle from harsh weather and heavy snow. However, the cover resembles a roof that is added onto a stationary vehicle for protection of said vehicle as opposed to an ice screen that secures ice formed atop a vehicle from falling during movement of said vehicle.

The Speece Patent (U.S. Pat. No. Des. 368,064) illustrates an ornamental design for an open-bottomed cover for mounting on the roof of a motor vehicle, which does not depict an ice screen.

The Van Dusen et al. Patent (U.S. Pat. No. Des. 413,562) illustrates an ornamental design for an extendible basket carrier for a vehicle roof rack, which does not depict an ice screen that secures ice to a top surface of a vehicle or trailer.

While the above-described devices fulfill their respective and particular objects and requirements, they do not describe a system comprising a plurality of brackets that attach atop a trailer or box truck for the purposes of securing an ice screen thereon that secures ice to a top surface of the trailer or box truck. In this regard, the ice screen departs from the conventional concepts and designs of the prior art.

SUMMARY OF THE INVENTION

The ice screen includes a plurality of brackets that attach said screen to a top surface of a tractor-trailer for securing ice formed atop said trailer. The brackets attach to the top surface of the trailer or box truck via attaching means comprising bolts, rivets, or screws. The ice screen is suspended above the top surface of the trailer or box truck via tubing, which forms channels of ice thereon. The ice screen enables ice to form between the ice screen and the top surface, but will prevent ice from accumulating above said ice screen in affect bonding the ice screen above the screen to the ice screen.

It is an object of the invention to provide an ice screen that will secure ice formed at a top surface of a tractor-trailer or box truck.

A further object of the invention is to provide an ice screen that prevents ice from accumulating above said ice screen while securing ice formed between the ice screen and the top surface of the tractor-trailer or box truck.

A further object of the invention is to provide an ice screen that secures ice atop said tractor-trailer until said ice melts when the appropriate temperatures or pressures arise.

A further object of the invention is to provide an ice screen that uses columns of tubing, which run lengthwise the ice screen in order to create channels of ice that run lengthwise of the tractor-trailer or box truck.

A further object of the invention is to provide a non-marring or scratching interface between the expanded aluminum tubing and the top surface of the tractor-trailer, utility trailer, flat top truck, or box truck.

These together with additional objects, features and advantages of the ice screen will be readily apparent to those of ordinary skill in the art upon reading the following detailed description of presently preferred, but nonetheless illustrative, embodiments of the ice screen when taken in conjunction with the accompanying drawings.

In this respect, before explaining the current embodiments of the ice screen in detail, it is to be understood that the ice screen is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ice screen. It is therefore important that the claims be regarded as including such equivalent construction insofar as they do not depart from the spirit and scope of the ice screen. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates a cross-sectional view of the ice screen along line 2-2 in FIG. 1, and detailing the use of rivets as the fastening means, and detailing the width of the ice screen as installed upon a trailer top that has a lip upon which the rivets pass through;

FIG. 3 illustrates a side cross-sectional view of the ice screen as installed upon a trailer;

DETAILED DESCRIPTION OF THE EMBODIMENT

Figure 1:
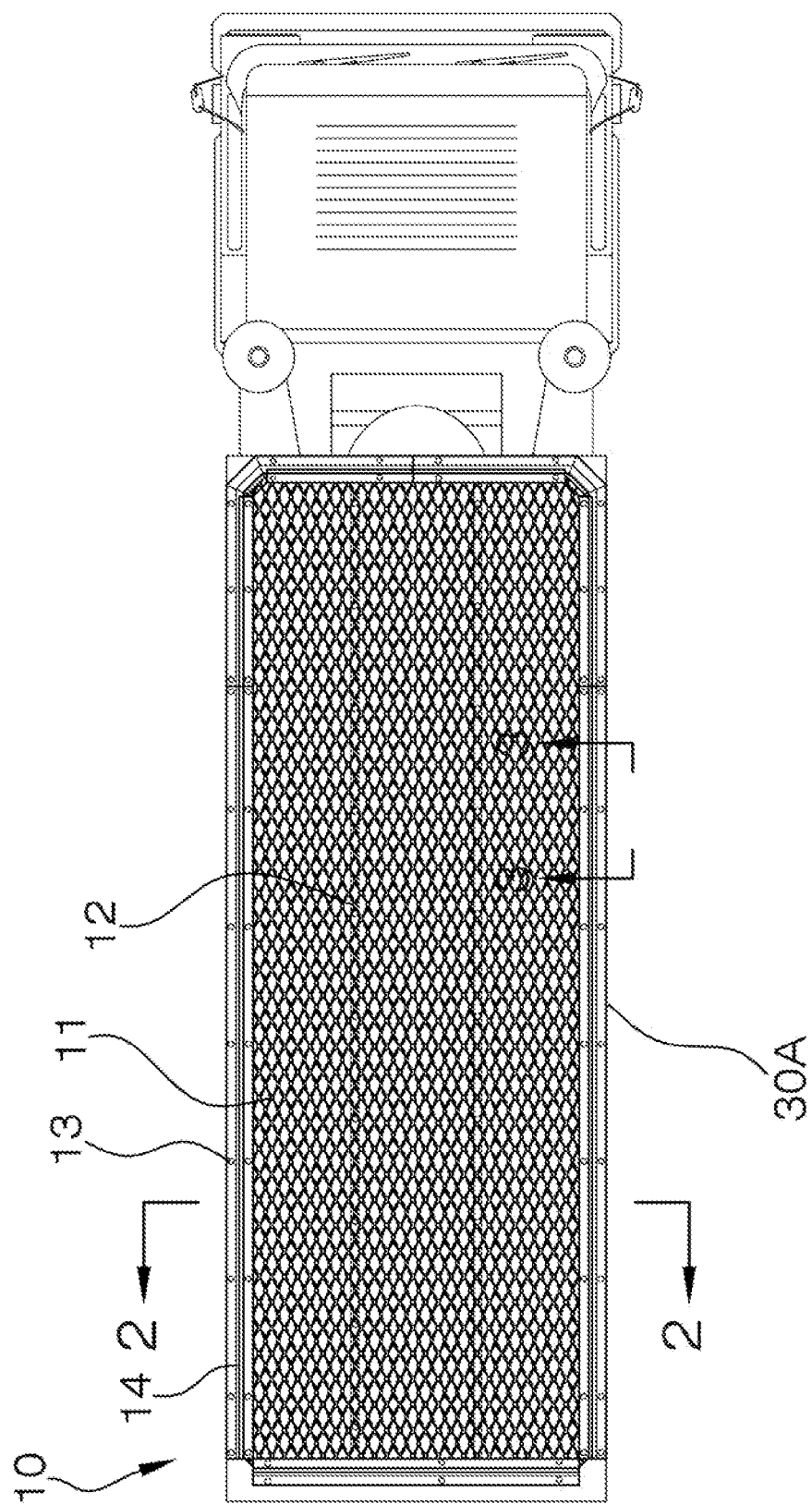
FIG. 1 illustrates a top view of the ice screen installed upon a trailer.

Detailed reference will now be made to the preferred embodiment of the present invention, examples of which are illustrated in FIGS. 1-6. A ice screen 10 (hereinafter invention) includes an ice screen 11, a plurality of tubing 12, fastening means 13, a plurality of brackets 14. The invention 10 is secured to trailer 30 top surface 30A via the brackets 14 and fastening means 13. However, it shall be noted that the invention 10 may be attached atop a box truck, utility trailer, or flat top truck 31 (see FIGS. 5 and 6).

The fastening means 13 comprises rivets, bolts, or screws. The fastening means 13 may further include the use of washers 13A or a sealing means 13B (hereinafter may be referred to as a urethane or rubber seal). The ice screen 11 expands over a majority of the area of the top surface 30A in order to remain effective in securing ice 32 thereon, or until said ice 32 can melt from the top surface 30A. The ice screen 11 is made of a material comprising a metal, plastic, rubber, wood, or carbon fiber composite. The ice screen 11 shall be a screen in the traditional sense as having a plurality of holes thereon, which enable snow or ice 32 to enter.

The construction of the invention 10 involves first connecting the tubing 12 to the ice screen 11 via the fastening means 13. The tubing 12 is composed of a hollowed cross-section comprising a square, hexagon, circle, triangle, or rectangular cross-section. The tubing 12 is made of a material comprising a metal, plastic, rubber, carbon fiber, or wood. However, it shall be noted that the use of aluminum may be ideally suited for application with the invention 10 in that it is lightweight and relatively affordable.

The tubing 12 runs the length of the tractor-trailer 30 forming channels of ice 32 thereon. The tubing 12 has multiple purposes: (1) form ice channels atop the top surface 30A, and (2) aid in suspending the ice screen 11 at a pre-determined height above the top surface 30A. The primary purpose of the invention 10 is to suspend the ice screen 11 at a specific distance above the top surface 30A in order to insure (1) that ice 32 that is attached to the top surface 30A is secured to the top surface 30A, and (2) to prevent ice from accumulating above the ice screen 11 by forming an insulating layer of air between the ice 32 and the ice screen 11.

The tubing 12 rests upon the top surface 30A of the trailer via an interface 15. The interface 15 has multiple purposes: (1) prevent scratching or marring of the top surface 30A of the trailer or box truck, (2) maintain a seal between the tubing 12 and the top surface 30A of the trailer 30, and (3) provide a medium for heat transfer from either the tubing 12 to the top surface 30A or vice versa. The interface 15 is made of a material comprising a metal, plastic, wood, rubber, or carbon fiber composite.

The brackets 14 run the periphery of the screen 11, and encompass the channels of ice 32 formed by the tubing 12. The brackets 14 are secured to the top surface 30A by the fastening means 13. It shall be noted that where the fastening means 13 secures the brackets 14 to the top surface 30A, the rubber or urethane seal 13B may be used to insure a watertight seal between the top surface 30A, the fastening means 13, and the respective bracket 14. The use of the rubber or urethane seal 13B and the shape of the bracket 14 will insure that upon melting of the ice 32, water will drain from specified locations that are called weep holes 14A (see FIG. 3). It shall be known that a plurality of weep holes 14A are provided and insure that once the ice 32 thaws, exits are provided for the water to drain from the top surface 30A.

The brackets 14 serve to insure that the ice screen 11 is tightly extended across the entire top surface 30A at a specified height, as discussed above. The brackets 14 secure to the ice screen 11 via fastening means 13. The brackets are made of a material comprising a metal, plastic, wood, rubber, or carbon fiber composite.

The brackets 14 may compose of either a single-piece of construction or a dual-piece construction (as depicted). Wherein single-piece of construction merely refers to the bracket 14 as a single piece that connects to the top surface 30A and the ice screen.

However, the dual-piece construction involves a top piece 14B and a bottom piece 14C. The bottom piece 14C connects to the top surface 30A via the fastening means 13 and has two angled turns that elevate itself above the top surface 30A where the ice screen 11 is sandwiched between the top piece 14B and the bottom piece 14C. The ice screen 11 is secured to the bracket 14 by the fastening means 13. The bottom piece 14C contains the weep holes 14A mentioned above.

Figure 2A:
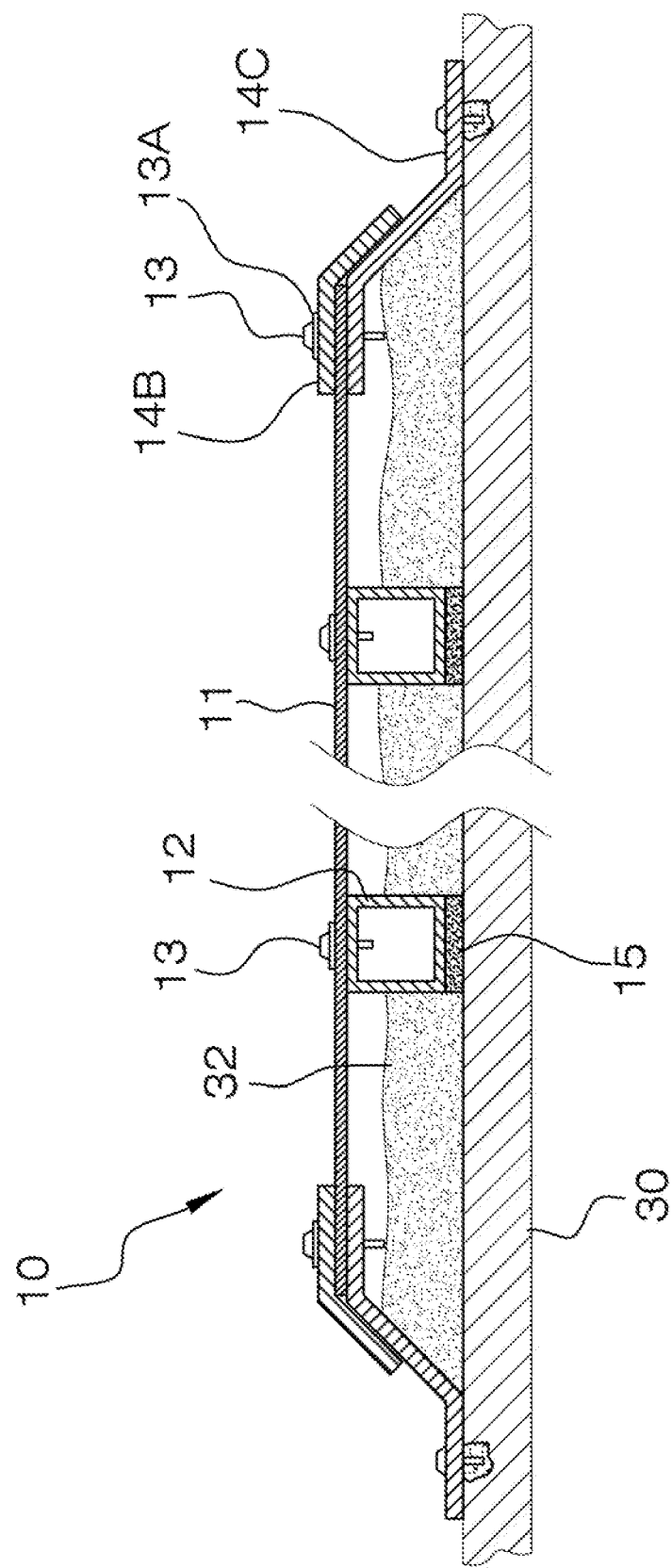
FIG. 2A illustrates a cross-sectional view of the ice screen along line 2-2 in FIG. 1, and detailing the use of rivets as the fastening means, and detailing the width of the ice screen as installed upon a trailer and with a residual amount of accumulation beneath the ice screen.
Figure 2B:
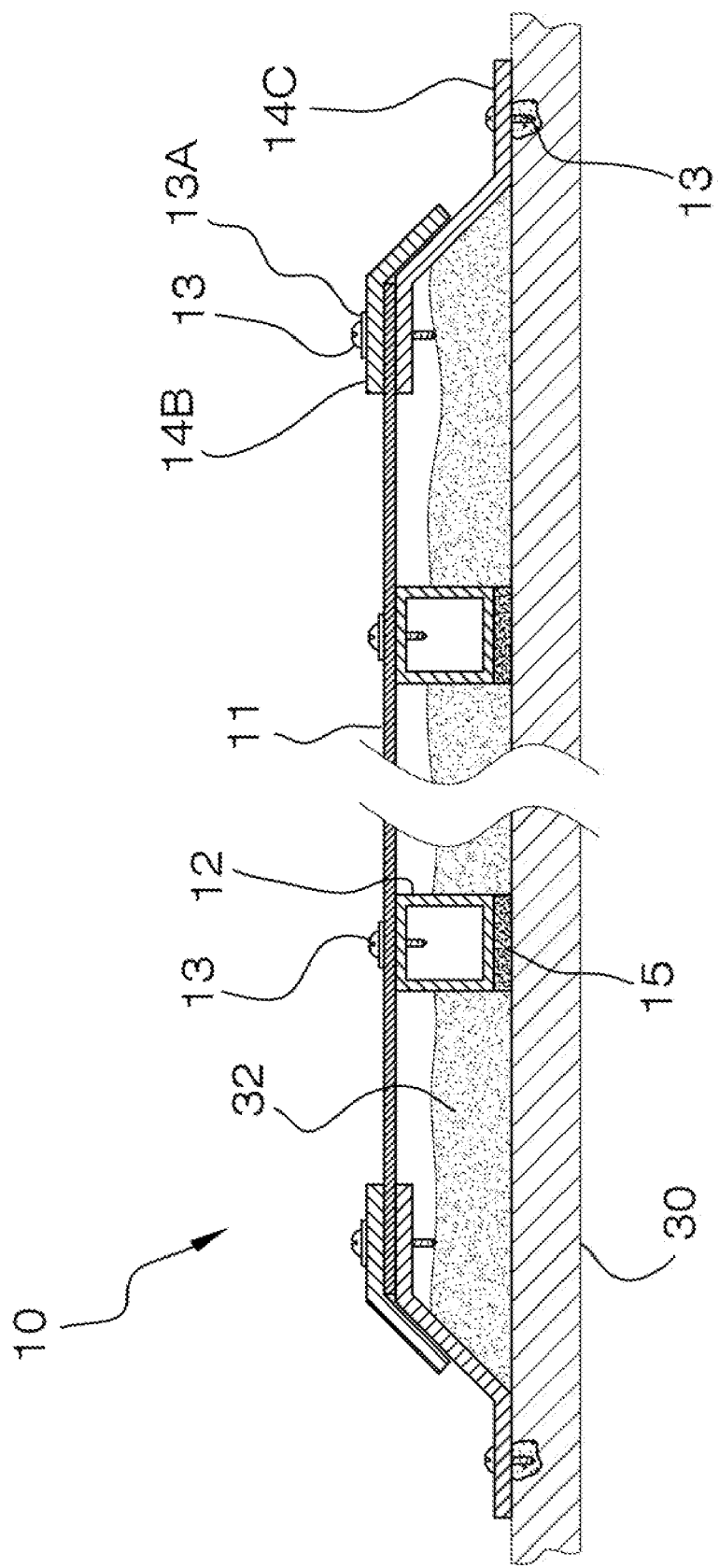
FIG. 2B illustrates a cross-sectional view of the ice screen along line 2-2 in FIG. 1, and detailing the use of screws as the fastening means.
Figure 2C:
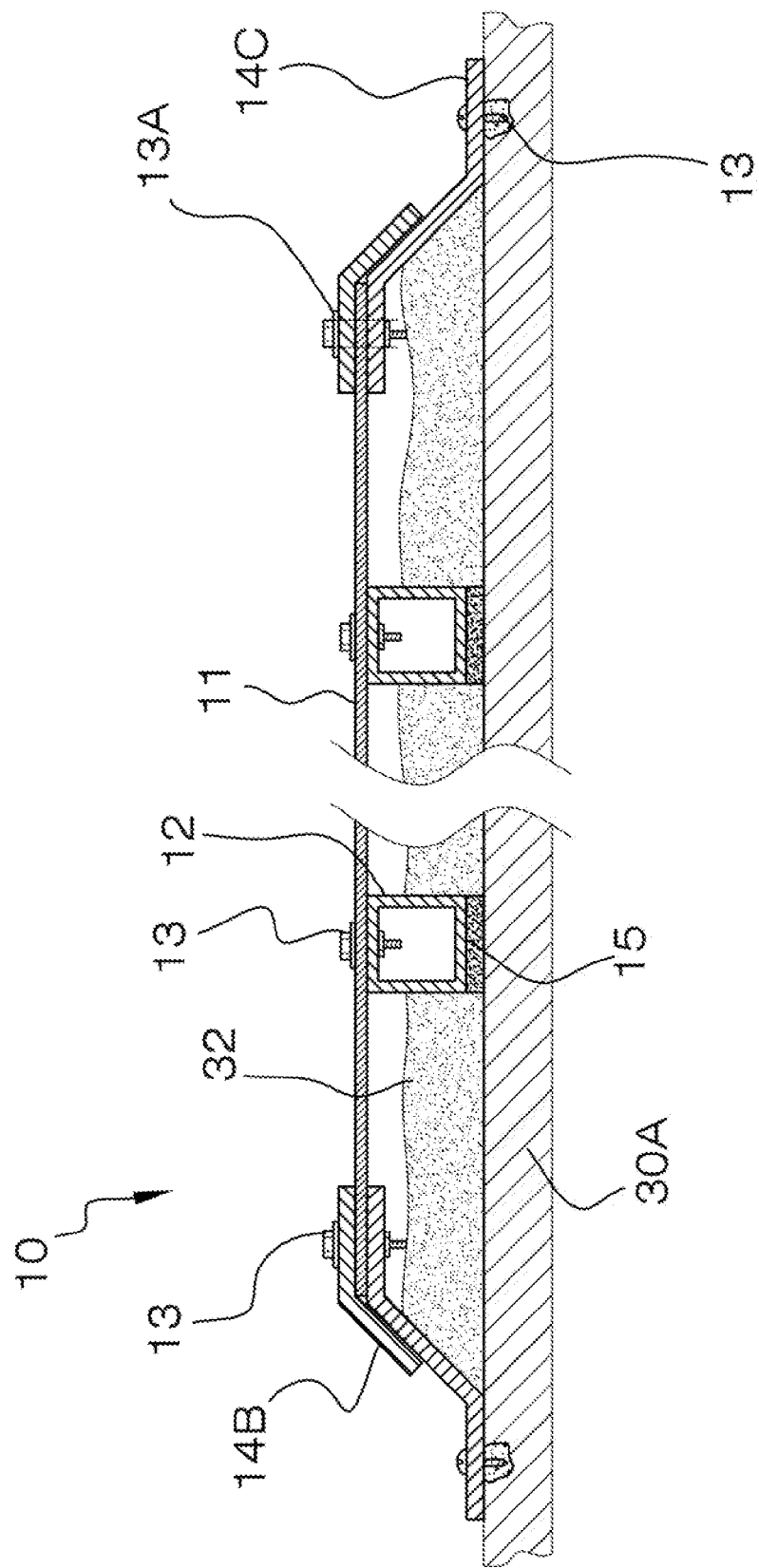
FIG. 2C illustrates a cross-sectional view of the ice screen along line 2-2 in FIG. 1, and detailing the use of bolts and nuts as the fastening means.
Figure 4:
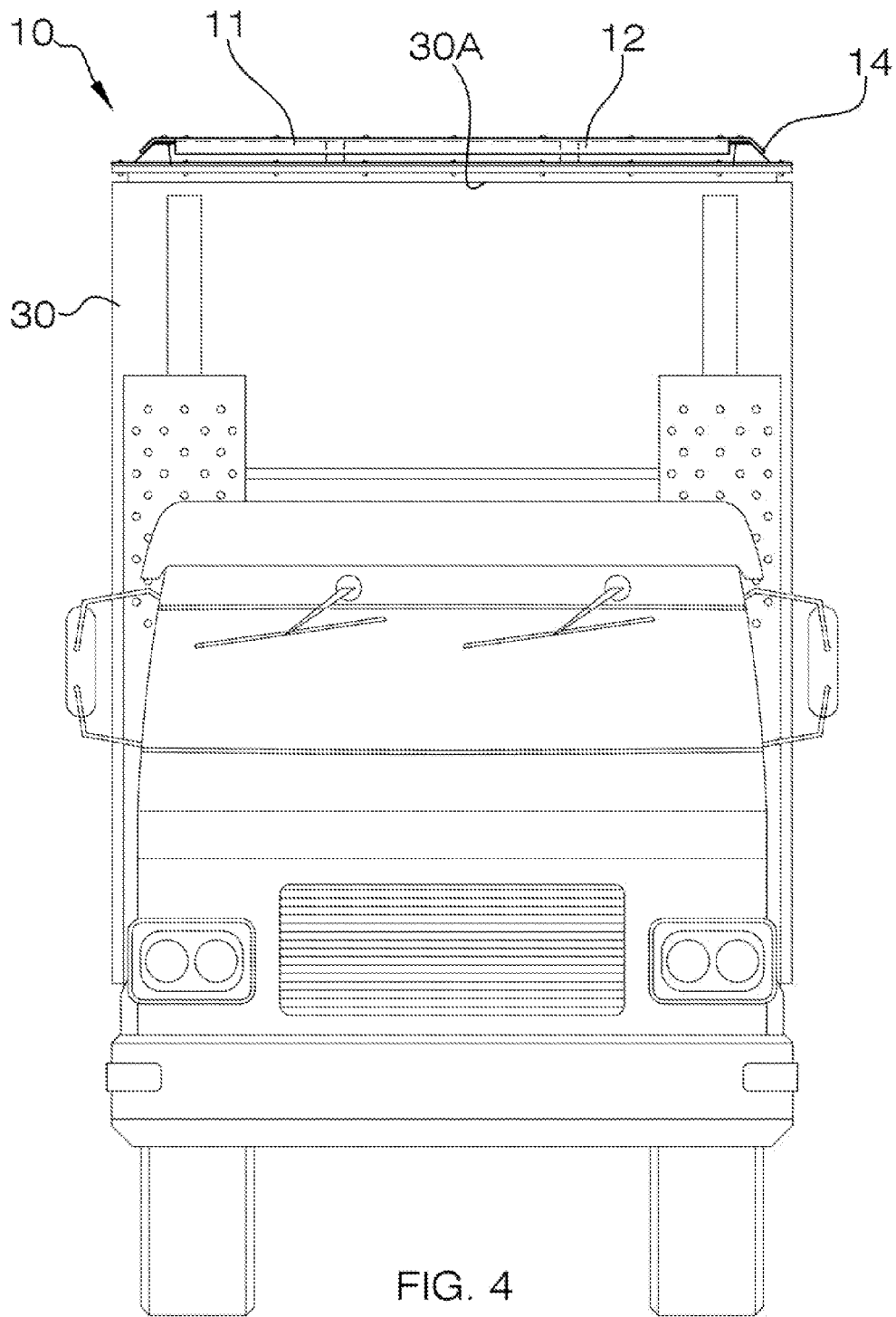
FIG. 4 illustrates a front view of a semi with attached trailer in which the ice screen is installed upon said trailer.

Referring to FIG. 2, the invention 10 is installed upon the trailer 30. However, the trailer 30 has a lip 30C that runs, the length of the sides of the trailer, and is used to enable the fastening means 13 to pass through in order to securely attach the bottom piece 14C thereon.

Figure 5:
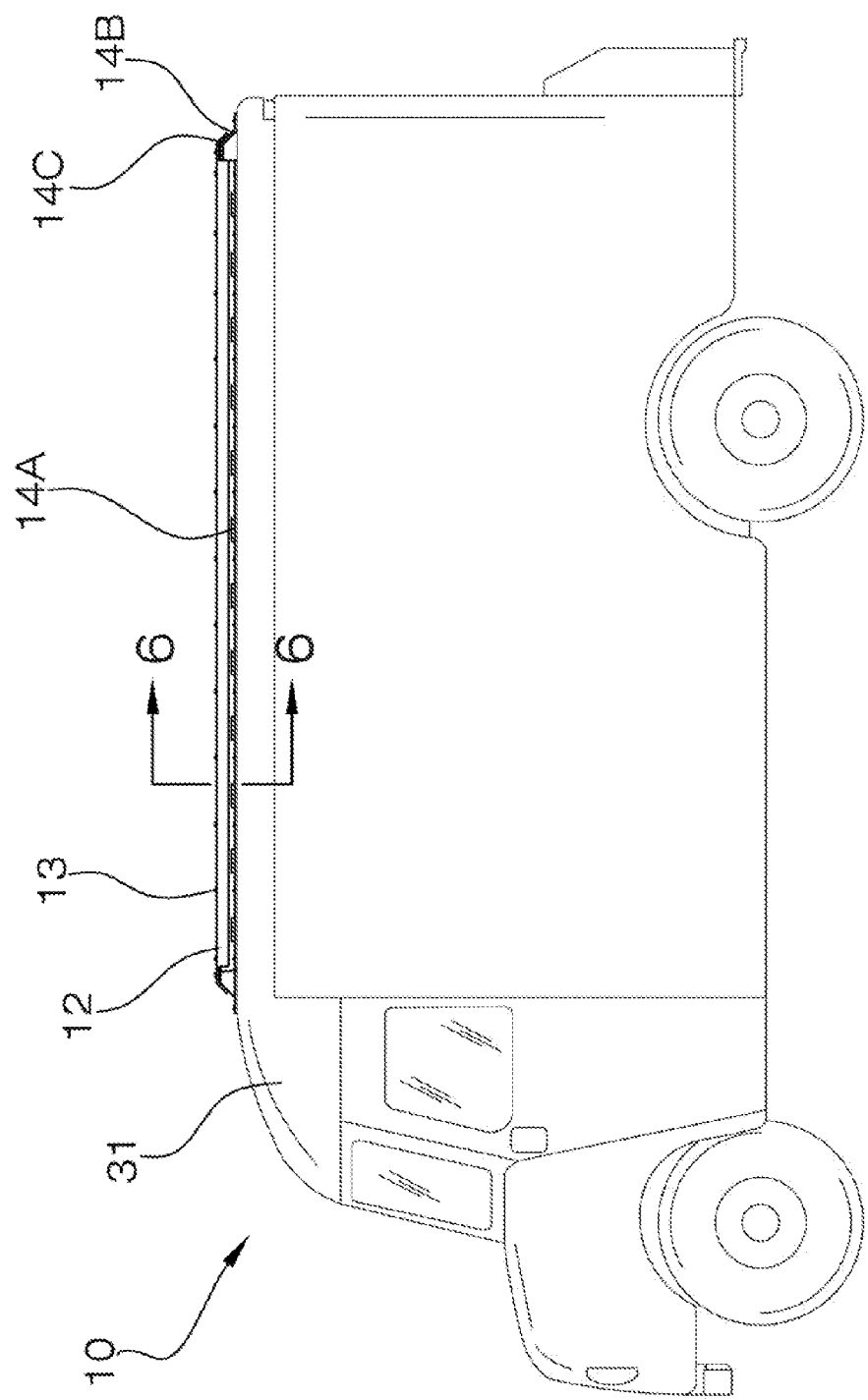
FIG. 5 illustrates a side view of the ice screen installed upon a box truck.
Figure 6:
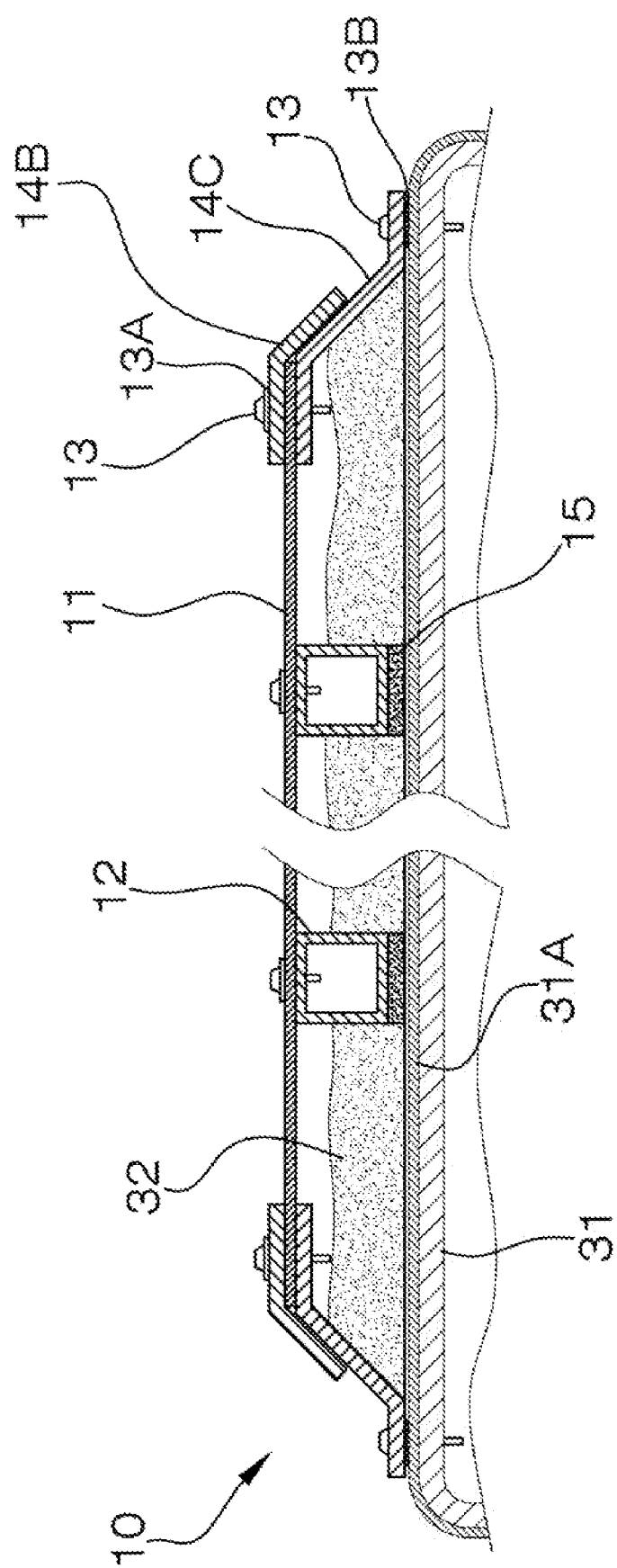
FIG. 6 illustrates a cross-sectional view of the ice screen along line 6-6 in FIG. 5, and detailing the use of rivets as the fastening means, and detailing the width of the ice screen as installed upon a box truck, utility trailer, or flat top truck.

Referring to FIGS. 5 and 6, the invention 10 is installed upon the box truck, utility trailer, or flat top truck 31 (hereinafter box truck). The installation of the invention 10 as depicted in FIGS. 5 and 6, may require the use of the rubber or urethane seal 13B to insure that no moisture can seep in along where the fastening means 13 secure to the box truck 31. The box truck 31, as depicted in FIG. 6, may feature or include a truck rib 31A. Both the box truck 31 and the truck 31A have fastening means 13 passing there through, and may further include the rubber or urethane seal 13B.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. An ice screen further comprising:
   wherein said ice screen is suspended above a top surface of a trailer in order to secure ice that has formed atop said trailer;
   wherein an insulating layer is formed between the ice and ice screen;
   wherein said ice screen is suspended above said top surface via a plurality of brackets;
   wherein the brackets have a plurality of weep holes that enable water from melted ice to exit the top surface;
   wherein the brackets are made of a construction further comprising a bottom bracket having at least two turns that secure to the top surface via a fastening means and of which attach to the ice screen via fastening means; and wherein said brackets stretch said ice screen tightly across said top surface at a pre-determined distance above said top surface;
   wherein the brackets are made of a dual-piece construction further comprising a top bracket; wherein said bottom bracket attaches to the top surface via fastening means; wherein said bottom bracket has at least two angled turns that extend upwardly; wherein the ice screen is sandwiched between the bottom bracket and the top bracket; wherein fastening means secures the sandwich formed via the top bracket, ice screen, and bottom bracket.

2. The ice screen as described in claim 1 wherein the brackets run the periphery of said top surface.

3. The ice screen as described in claim 1 wherein the brackets are made of a material comprising a metal, plastic, rubber, wood, or carbon fiber composite.

4. The ice screen as described in claim 1 wherein the ice screen is suspended above the top surface by tubing that runs lengthwise down said top surface; and wherein said tubing is of hollow construction.

5. The ice screen as described in claim 4 wherein a plurality of lines of tubing run lengthwise down said top surface in order to form channels with ice situated between the top surface and the ice screen.

6. The ice screen as described in claim 4 wherein the tubing rests upon an interface, which forms a seal between the tubing and top surface, and wherein the interface is made of a material comprising one of a metal, plastic, wood, rubber, and carbon fiber composite.

7. The ice screen as described in claim 4 wherein the tubing is made of a material comprising one of a metal, plastic, wood, rubber, and carbon fiber composite.

8. The ice screen as described in claim 1 wherein the fastening means comprises at least one of bolts, screws, and rivets.

9. The ice screen as described in claim 8 wherein a sealing means is used to seal the top surface, fastening means, and brackets; and wherein said sealing means may comprise one of a rubber and urethane.

10. The ice screen as described in claim 1 wherein the trailer is one of a utility trailer, box truck, flat top truck, and a tractor-trailer.

11. An ice screen further comprising:
    wherein said ice screen is suspended above a top surface of a trailer in order to secure ice that has formed atop said trailer;
    wherein an insulating layer is formed between the ice and ice screen;
    wherein said ice screen is suspended above said top surface via a plurality of brackets, which run the periphery of said top surface; wherein said brackets have a plurality of weep holes that enable water from melted ice to exit the top surface;
    wherein said brackets further comprise a bottom bracket and a top bracket; wherein said bottom bracket attaches to the top surface via fastening means; wherein said bottom bracket has at least two angled turns that extend upwardly; wherein the ice screen is sandwiched between the bottom bracket and the top bracket; wherein fastening means secures the sandwich formed via the top bracket, ice screen, and bottom bracket;
    wherein the ice screen is suspended above the top surface by tubing that runs lengthwise down said top surface;
    wherein the tubing rests upon an interface, which forms a seal between the tubing and top surface; and wherein a sealing means is used to seal the top surface, fastening means, and brackets.

12. The ice screen as described in claim 11 wherein the brackets, tubing, and ice screen are made of a material comprising one of a metal, plastic, rubber, wood, and carbon fiber composite.

13. The ice screen as described in claim 11 wherein the fastening means comprises at least one of bolts, screws, and rivets.

14. An ice screen further comprising:
wherein said ice screen is suspended above a top surface of a box truck in order to secure ice that has formed atop said box truck;
wherein an insulating layer is formed between the ice and ice screen;
wherein said ice screen is suspended above said top surface via a plurality of brackets, which run the periphery of said top surface; wherein said brackets have a plurality of weep holes that enable water from melted ice to exit the top surface;
wherein said brackets further comprise a bottom bracket and a top bracket; wherein said bottom bracket attaches to the top surface via fastening means; wherein said bottom bracket has at least two angled turns that extend upwardly; wherein the ice screen is sandwiched between the bottom bracket and the top bracket; wherein fastening means secures the sandwich formed via the top bracket, ice screen, and bottom bracket;
wherein the ice screen is suspended above the top surface by tubing that runs lengthwise down said top surface;
wherein the tubing rests upon an interface, which forms a seal between the tubing and top surface; and
wherein a sealing means is used to seal the top surface, fastening means, and brackets.

15. The ice screen as described in claim 14 wherein the brackets, tubing, and ice screen are made of a material comprising one of a metal, plastic, rubber, wood, and carbon fiber composite.

16. The ice screen as described in claim 14 wherein the fastening means comprises at least one of bolts, screws, and rivets.

* * * * *